Nov. 17, 1970  W. J. LAWSON  3,540,074
GIBLET INSERTER

Filed Oct. 11, 1968  3 Sheets-Sheet 1

INVENTOR
WILLIAM J. LAWSON

BY
ATTORNEYS

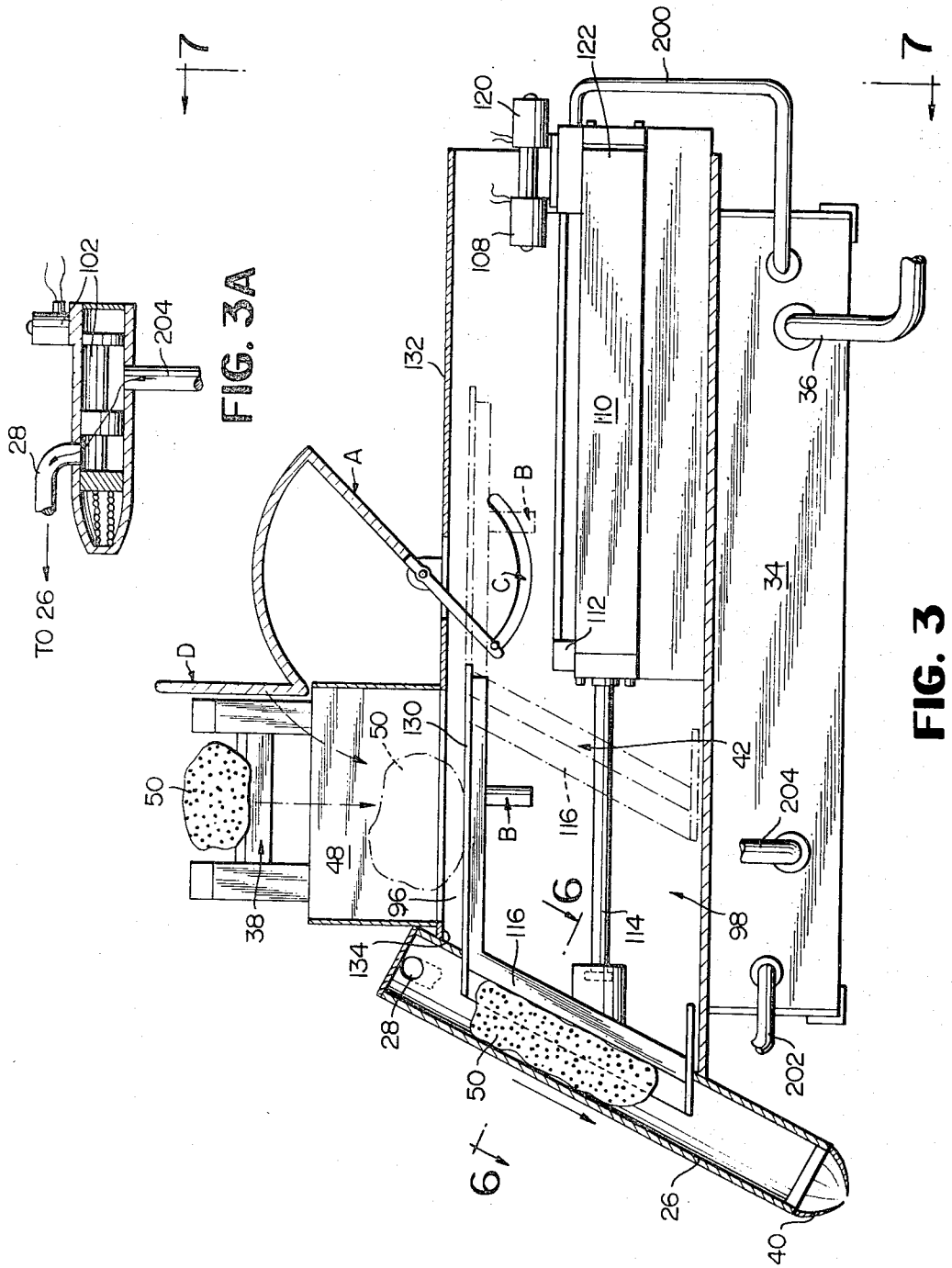

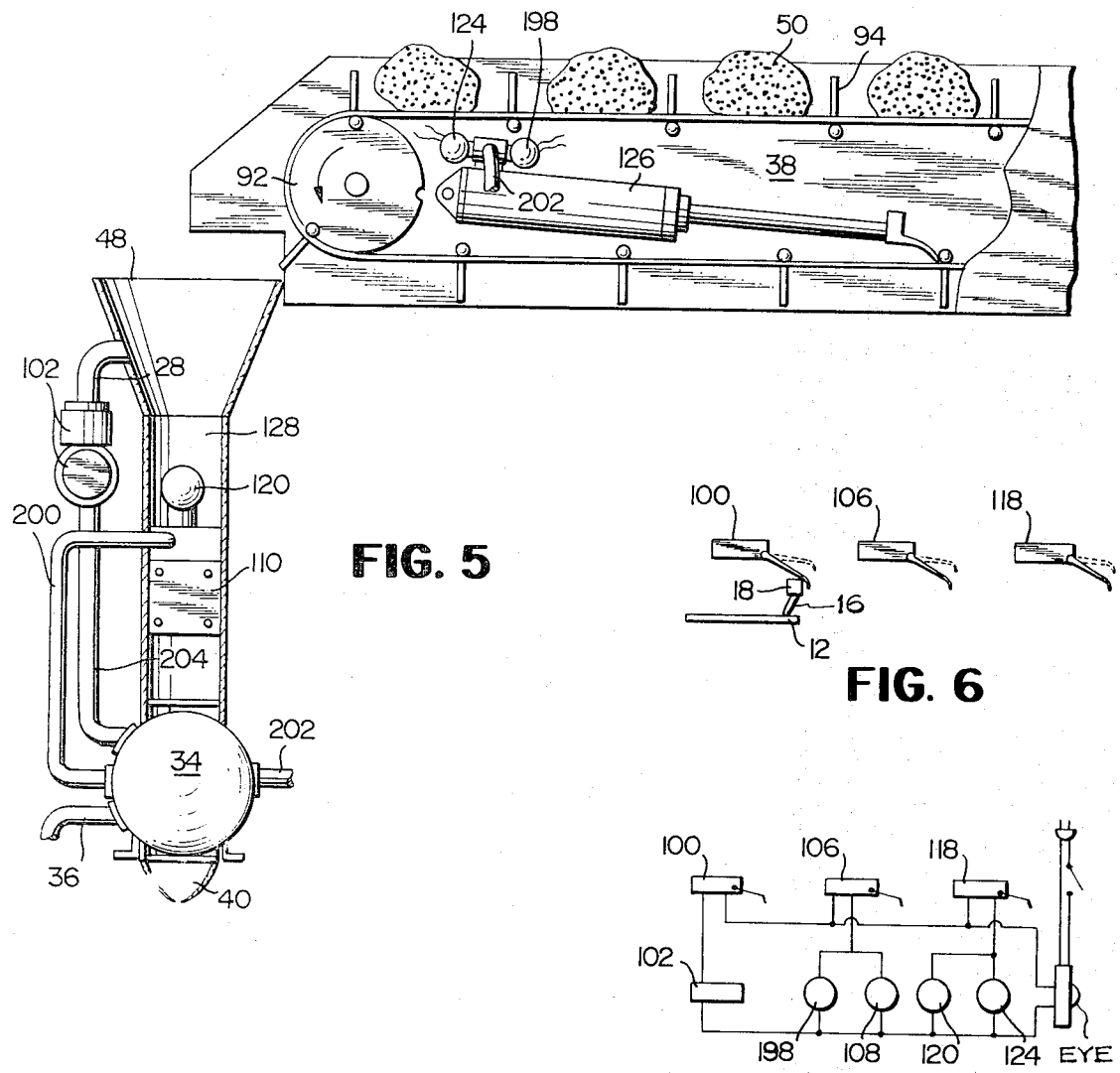

United States Patent Office 3,540,074
Patented Nov. 17, 1970

3,540,074
GIBLET INSERTER
William J. Lawson, R.D. 1, Box 299E,
Milton, Del. 19968
Filed Oct. 11, 1968, Ser. No. 766,822
Int. Cl. A22b 15/00
U.S. Cl. 17—11         10 Claims

ABSTRACT OF THE DISCLOSURE

A device for inserting giblets or packaged components into fowl, comprising a continuously operating conveyor for sequentially presenting fowl to an inserting device, means to feed giblet packages individually to the inserting device, means to load the giblet packages into the inserting device, means to eject individual giblet packages from the inserting device into a fowl cavity as it passes the inserting device, and means to synchronize movement of the components whereby automatic actuation of the inserting device is initiated by the presence of a fowl, whereby actuation of the inserting device occurs only when the loading device is empty, and whereby the loading device is empty, and whereby the feeding means is activated only when the loader is empty.

PACKAGING DEVICE

This invention relates to a device for inserting articles into containers. The device is specifically adapted to be used in inserting edible components such as giblet, neck, stuffing mixtures, etc., into the cavities of fowl. Even more specifically, the invention provides a device for automatically inserting giblet packages into fowl cavities which is synchronized in operation so that a continuously moving group of fowl may be filled individually by an automatic inserting means.

While it should be understood that the invention is not specifically limited to devices which are used to package giblets or necks in fowl cavities, it should also be understood that this is the most practical purpose found for the invention, and, therefore, the invention will be described in terms of such a process and apparatus. Other applications include inserting edible stuffing mixtures into fowl.

In the field of packaging fowl for consumption, it has been the practice in the past to employ personnel to stuff the fowl with giblets and other components of the fowl which have been processed. The processing can include packaging, cleaning, separating, cooking, mixing, etc., and the packages are transferred by personnel into slow moving fowl carried by conveyors. It is obvious that the use of manual labor on a conveyor and in a continuous operation such as that contemplated is inefficient and impractical. Accordingly, it has been desired to provide an apparatus for inserting the packages automatically into the fowl, which would avoid the necessity for using manual labor. Such devices have not been satisfactory in the past since, before they will become economical and efficient, it is required that the conveyor containing the fowl be moved at a high rate of speed, e.g., 8,000 fowl per hour should pass a given point on the processing line. Such speeds are not attainable by previously used devices, since it was not possible to automatically insert the package into the fowl cavity without damaging the fowl at such high speeds.

Exemplary semi-automatic devices for filling fowl cavities provide a screw fed mixture to a flexible hose which hose is inserted by an operator into a fowl cavity and filling is initiated by the operator. These devices are slow and require the operator to either remove the fowl from a conveyor and present it to the feed tube or to move the feed tube into the fowl cavity. Also, the additional step of initiating the feed supply is performed by the operator.

Accordingly, it has been long felt in the industry that an automatically operating device for inserting edibles into the cavity of the fowl is desirable. The inventor has devised a system for continuously packaging giblets, etc., in fowl which comprises an automatically operating system capable of rapid operation and is thus capable of economical use in the processing industry.

Essentially, the invention comprises a device for individually inserting giblet packages in fowl, comprising a continuously operating fowl conveyor and an aligned inserting means wherein the inserting means further comprises a feed means which individually presents giblet packages, a loading means which individually transfers giblet packages to an ejector, and an ejecting means for individually inserting a giblet package in a fowl as that fowl passes in alignment with the inserting device arranged along the processing linen. Means are provided to synchronize the operation of the intermittently operating feeder, loader, and ejector whereby the continuously moving fowl conveyor can be operated wtihout damage to the fowl or without slowing the processing apparatus.

In view of the above-noted deficiencies of previously used systems, it is a primary object of this invention to provide a continuously operating system for processing fowl.

It is another object of the invention to provide a method and apparatus for inserting giblet packages into fowl wherein means are provided for automatically timing the insertion of the packages so that as each fowl passes the inserting station a giblet package will be inserted therein.

A still further object of the invention is to provide an inserting device comprising a feed means which intermittently operates to provide a giblet package and a loading means which transfers said giblet package to an ejector means in a continuous and automatic cycle.

These and other objects of the present invention, as well as advantages of the invention, will become apparent from a consideration of the following description and drawings wherein a preferred embodiment of the invention is presented by way of non-limiting description.

In the drawings, FIG. 1 is a side elevation view showing a conveyor presenting a fowl to the inserting device of the present invention.

FIG. 3 is a side view in partial section showing the inserting device and its components according to the present invention.

FIG. 3A is a detail view showing a solenoid valve.

FIG. 4 is a sectional view of the ejector and loading device taken along 6—6 of FIG. 3.

FIG. 5 is a partial rear view of the loading and ejecting mechanism according to the present invention taken along line 7—7 of FIG. 3.

FIG. 6 is a schematic view taken along line 8—8 of FIG. 2, illustrating switch means suitable for synchronizing the operation of the ejector with the conveyor.

FIG. 7 is a schematic view of a suitable circuit for controlling the elements of the present invention.

Figure 1:
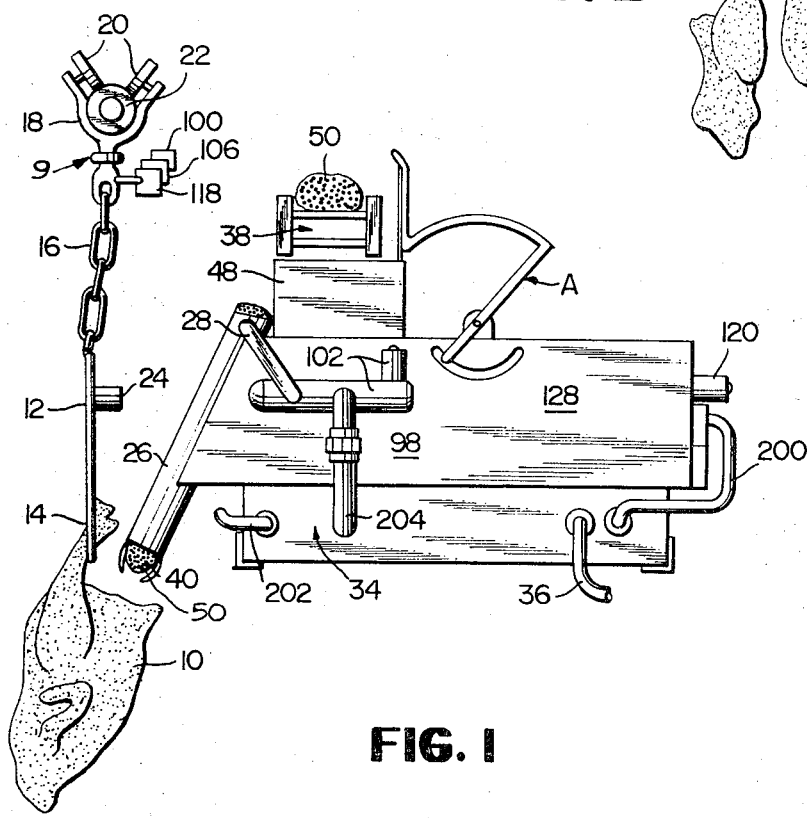

Referring now more specifically to the figures, FIG. 1 illustrates a fowl 10 which is attached to a conveyor system by means of shackles 12 with leg spacers 14. Shackles 12 with leg spacers 14 are in turn attached by means of chain 16 to a yoke 18 which has rollers 20 adapted to contact a cylindrical bar 22. A guide 24 is provided to align the fowl 10 with the ejecting device, generally designated 26. The ejecting device 26 comprises an outlet portion 40 and an inlet portion 134 to be discussed more fully hereinafter. Attached to the ejecting device 26 is a loader means 128 which is adjacent to a feeding conveyor 38. Additionally, an air cylinder 34 fed by suitable supply line 36 and having several outlets 200, 202, and 204 is provided. The outlet portion 40 of the ejecting device 26 comprises a flexible portion which may be a rubber or plastic tubular element adapted to normally close the outlet of 26, but adapted to be flexed upon the application of suitable pressure to allow an article to be passed through outlet 40. Air cylinder 34 and its function will appear in the discussion hereinafter.

Figure 2:
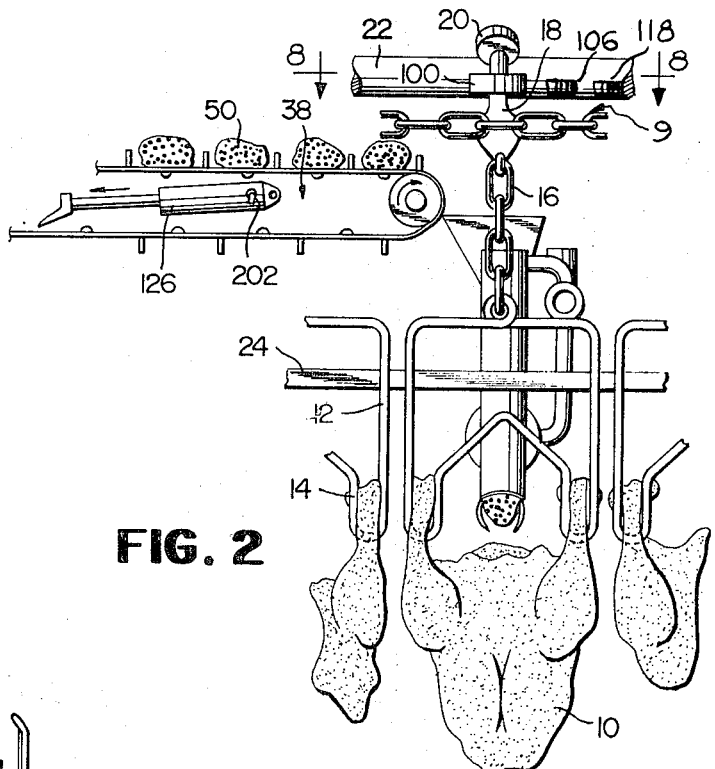
FIG. 2 is a partial front elevation view showing the conveyor and fowl presented to the inserting device of FIG. 1.

Turning to FIG. 2, it is seen that ejecting device 26 is aligned with the cavity of fowl 10 as it passes along the processing line, generally corresponding to guide 24. As the conveyor moves, the yoke 18 contacts a series of switches, one of which is shown as 100 in FIG. 2. These switches activate the components of the invention in a manner to be more fully discussed.

In processing fowl, the conventional process involves dressing by killing, then scalding, picking, cleaning, singeing, washing, and viscerating. The edible viscera may be removed, and the giblets washed and processed for later re-insertion into the fowl cavity. Next, the feet and neck are cut off, and the neck may be processed for later re-insertion. The carcass is washed inside and out. Generally, the bird is then placed in ice slush cooling tanks and chilled for approximately 45 minutes or more to develop tenderness, drained, and loaded on conveyor shackle 12 with leg spacer 14. Leg spacers 14 are spaced so as to spread the legs and open the fowl cavity.

Turning to FIG. 3, the structural details of the inserting device may be seen. The central components of the inserting device comprise an ejecting device which has a pressure inlet tube 28 positioned therein and which has an outlet 40 and an inlet 134. Associated with the inlet 134 is a loading trough generally designated 98 which is preferably of rectangular cross section. The loading device comprises a reciprocal rod 114 having a pusher element 116 attached thereto. The reciprocal rod 114 is actuated by a hydraulic system or pneumatic system comprising a piston cylinder 110 which may be a conventional Schraeder cylinder having a single inlet and single outlet and a movable piston. The piston cylinder 110 in the preferred embodiment comprises a pneumatic chamber having valves 108 and 120 fed by air cylinder 34. Application of air through valve 120 causes rod 114 to move to the left of FIG. 3 and to thereby push a giblet package 50 which becomes entrained on pusher element 116 into ejecting device 26. The element 116 comprises an essential element of the invention. Additionally, a further essential component comprises the feed means 38 which supplies individual giblet packages to the loading device 128 and subsequently to the ejecting device 26. The feed means 38 may comprise an intermittently operated conveyor system which sequentially presents giblet packages 50 to the pre-load station (funnel) 48 indicated in FIG. 3 on top of slidable cover plate 130. It is thus seen that the operation of the intermittent conveyor 38 will deposit a giblet package on slidable cover plate 130 in its forward position and temporarily prevent its entry into trough 98. The giblet package is thus held ready to be received in the loading device 128. The transfer into the loading device cannot be accomplished until piston rod 114 returns to the position shown in dotted lines in FIG. 3 carrying slidable cover plate 130 to its rearward position. At this time, package 50 will be engaged by the rear portion of pre-load station 48 and will be stopped from moving backwardly as pusher 116 moves backwardly. When pusher 116 has been retracted, slidable cover plate 130 is retracted, thus exposing the top of loading trough 98 whereby the article or giblet package 50 will drop into trough 98 in alignment with pusher element 116; and thus, the loading device is loaded.

In order to insure that the package 50 passes from conveyor 38 into funnel 48, an optional system A–B is shown in FIG. 3. B comprises a lug welded onto slidable cover plate 130 and positioned so as to trip the lower leg of element A. (A) comprises a pusher which can slide in slot C, thereby pivoting its upper part D from the position shown in FIG. 3 down into funnel 48, thereby engaging and carrying package 50 into pre-load position.

As shown in FIGS. 4 and 5, the components of the inserting device are structurally related. In FIG. 4, the pusher element 116 is seen to be a U-shaped element which is sized to fit opening 134 and is also sized to fit snugly into loading trough 98. Also, package 50 fits snugly in the assembled tube formed by ejecting means 26 and pusher 116. In FIG. 5, the relationship of feed conveyor 38 and loading device 128 is seen. Conveyor 38 is vertically above 128 and is aligned with pre-load station (funnel) 48. Conveyor 38 carries upright spacers 94 as it passes around roller 92. Thus, a package is dumped from conveyor 38 into pre-load station 48 which is a funnel or trough directly above trough 98 and slidable cover plate 130. The operation is synchronized so that a single package at a time is provided to the loader and subsequently transferred to the ejecting device. The sequence of operation is controlled by valves 102, 108, and 120 which control air flow from cylinder 34.

By means of switches actuated by the poultry as they travel along the processing line, the operation occurs as follows. When switch 100 is tripped by a fowl yoke 18, solenoid 102 is actuated or opened, thus allowing compressed air to flow from air cylinder 34 through outlet 204 and through valve 102 and tube 28 into the ejecting means 26. Since giblet package 50 is sized so as to substantially fill the cross sectional area of the tube and since element 116 forms a closed system with tube 26, as shown in FIG. 4, the presence of a pressurized air chamber at the top of the tube will force giblet package 50 along the tube and out through the flexible outlet 40. When this occurs, a giblet package is inserted into the cavity of a fowl. As the fowl moves along the conveyor, a second switch 106 of FIG. 6 is tripped. Switch 106 actuates valve 108. As shown in FIG. 3, valve 108 is attached to air cylinder 110. When valve 108 is opened, pressurized fluid may flow from chamber 34 through outlet line 200 into piston cylinder 110. The presence of the pressurized air in piston cylinder 110 at its forward portion 112 simultaneously exhausts the opposite end 122 of the container and causes the piston attached to rod 114 to move into its retracted position. Likewise, when valve 120 is opened, front end 112 is automatically opened for exhaustion. As rod 114 moves backwardly, it simultaneously carries pusher element 116 and slidable cover plate 130 therewith, and, as noted above, it allows a subsequent giblet package 50 to fall from funnel 48 into a loading position in trough 98. Thus, the cycle will repeat each time a fowl trips switch 100, and the cycle of ejection retraction, loading, and positioning will repeat. Returning to switch 118, reference to FIG. 7 will show that this switch is also connected to the control for feed conveyor 38 (see air cylinder 126 fed by line 202 of FIG. 5). Thus, not only is the giblet package 50 pushed into the loading chamber, but also a subsequent giblet package is caused to be deposited on the top of slidable cover plate 130. Air cylinder 126 is identical to air cylinder 110, both being conventional devices. Alternatively, the conveyor 38 may operate continuously with packages 50 spaced thereon so as to reach the loading position at the right time.

Following the stuffing operation, the stuffed birds are immediately trussed, bagged, and frozen according to conventional procedures. Furthermore, it is possible to align several of the inserting devices of this invention so that two or more individual packages (e.g. a giblet package then a stuffing package) may be inserted prior to bagging. Likewise, a plurality of inserting devices may be aligned and fed with, for erample, giblet packages whereby alternate fowl are filled by each inserting device, thus additionally increasing the rate of production.

From the above-described specific embodiment of the invention, it will be obvious that a continuous and automatic system has been provided which is particularly adapted to insert giblet packages into fowl cavities. It will further be obvious that many modifications of the system are contemplated and are possible. Additionally, it is noted above that the system may be used for packaging other articles in other cavities. Although it is not generally necessary in packaging articles into containers that consideration be given to the speed of operation and to the delicacy of the container, it frequently occurs in food applications that the article to be inserted and/or the container adapted to house the articles must receive special treatment. It may be seen that each system of the present invention is adapted to handle an article without damaging it. The use of air pressure is particularly feasible and suitable for use with food packages, and no inordinate amount of pressure need be applied which could possibly damage the food.

Some modifications of the present system may be utilized to increase the effectiveness of the overall process. For example, fluids other than air may be used to actuate the system. While air is particularly adapted for use with foods likely to be damaged, it is equally possible to use any fluid which can be pressurized and can be transported to operate pneumatic or hydraulic systems. Other gases as well as liquids are usable. It is also possible in other applications to utilize a piston rather than a fluid pressure system. The piston would reciprocate to force an article out of tube 26 and into a container.

Solenoid operated valves which are contemplated for use herein may be any conventionally used system which will at once be obvious to one skilled in the art. A suitable valve is shown in FIG. 3A. Solenoid operated valves are particularly adapted for use in electrical circuit; however, other valves such as gate valves and electrically or photoelectrically operated valves could be utilized. In the use of solenoid operated valves, it may be necessary to provide each solenoid with a capacitor which stores energy and which, upon actuation, releases that energy simultaneously to activate the electromagnetic coil, and thus activates the valve stem, moving it into an open position. It is equally obvious that other means may be used for actuating the pressure control systems of the present invention. For example, instead of using switches 100, 106, and 118, which are physically contacted and tripped by the poultry conveyor, it is possible to use photoelectric scanning systems, magnetic scanning systems, or any other device which will indicate the presence of fowl at a designated position. In this respect, it should be noted that one suitable modification of the invention could provide a photoelectric scanning system which would indicate the presence of a fowl in the conveyor and thus control operation of the inserter only when a fowl is present. For example, in the designated and disclosed system, the fowl yoke 18 rather than the fowl itself trips the activating switches. It is possible to modify this by scanning the system to insure that a fowl is present before the inserter is actuated. In such a modification, the circuit diagram would be modified as shown in FIG. 7 to include an electronic eye in series with the trip switches.

As has been previously noted, a suitable operating speed for the present apparatus would enable 8,000 fowl per hour to pass the inserting station. The operation is achieved by conventional electric drive motors attached to the continuously operated conveyor for fowl. Any motor may be used which will provide the desired speed. Additionally, instead of the air cylinder 126, a motor may be used on the intermittently operated conveyor 38, which motor may be of conventional construction operating on AC or DC current. This motor is useful in cases where continuous operation of conveyor 38 is contemplated.

By way of non-limiting example, the system is capable of operating at 7200 birds per hour. At this speed, the conveyor yoke 18 moves 12 inches/second with birds spaced 6 inches apart. The maximum time required for a cycle of the apparatus is 0.05 second; and during this time, the bird has traveled 0.6 inch, thus no danger of damage to the fowl during insertion is experienced. The time elapsed from initial contact of switch 100 to insertion of package 50 is 0.044 second, during which time the bird has traveled 0.528 inch. The additional time and distance are required to actuate last switch 118 and load the system for the next cycle. The package 50 travels out of tube 26 at about 315 feet/second at 100 p.s.i. The air cylinder 34 may be maintained at 60 p.s.i. Operation at 100 p.s.i. gives about 315 lbs. static pressure or push in tube 26 and about 176 lbs. push behind pusher element 116.

Structurally, the components of the present invention should be made of light, yet durable, materials. Stainless steel materials are suitable for easy cleaning, and lubrication should be provided between all the moving parts. No particular dimensions are significant with respect to the apparatus since it is adapted for use in so many different types of application. However, a conventional giblet package will have a diameter of less than 8 inches, and accordingly, the tube 26, trough 98, and funnel 48 should have a corresponding diameter to prevent free fall of the giblet package. It is an obvious and conventional modification to adapt the apparatus to handle packages of different sizes. Likewise, different structural materials may be utilized.

Having described my invention in accordance with the patent statutes in full, clear, concise terms, and having illustrated and discussed specific preferred embodiments of the invention, what is desired to be secured by Letters Patent is.

I claim:

1. A device for inserting an article into a container cavity, comprising a continuously operating container conveyor, an inserting means aligned with said conveyor, and comprising a feeder means to supply articles sequentially to a loader, a loader means to supply individual articles to an ejector, an ejecting means to eject an article from said inserter into a container, and means to synchronize movement of said conveyor and inserter so that the presence of a container sequentially and automatically actuates the ejector, the loader, and the feeder.

2. The device of claim 1 wherein the ejector, the feeder, and the loader are actuated by electrical switches.

3. The devise of claim 1 wherein the feeder means comprises a conveyor synchronized to supply individual articles to the loader means only when the ejecting means is empty.

4. The device of claim 1 wherein the loader means comprises a U-shaped trough aligned with the ejecting means and a pusher element slidable in said trough into and out of engagement with said ejecting means.

5. The device of claim 1 wherein the ejecting means comprises a tubular element having an article inlet, a fluid inlet, and a single article and fluid outlet.

6. The device of claim 2 wherein said switches control pneumatic valves.

7. The device of claim 1 wherein said means to synchronize further includes scanning means to actuate the device only when a container is present.

8. The device of claim 4 wherein said pusher is connected at one end to a piston within a cylinder.

9. The device of claim 3 including control means for said feeder means to intermittently activate the feeder means.

10. A process for inserting edible packages into fowl cavities comprising the steps of continuously moving fowl sequentially to an inserting station, moving edible packages to a loading station, intermittently moving packages to an ejecting station, and automatically but intermittenly ejecing a package into each fowl cavity as it passes the inserting station at its normal rate of travel.

References Cited
UNITED STATES PATENTS

| | | | |
|---|---|---|---|
| 2,923,630 | 2/1960 | Bonami | 17—11 |
| 2,928,748 | 3/1960 | Rogers et al. | 99—194 |
| 3,175,938 | 3/1965 | Moberg | 99—107 X |
| 3,416,931 | 12/1968 | Posegate | 99—107 |
| 3,475,785 | 11/1969 | Woods | 17—11 |

ALDRICH F. MEDBERY, Primary Examiner

U.S. Cl. X.R.

99—107